July 26, 1932.  E. BUGATTI  1,868,937

CRANK SHAFT BEARING

Filed Nov. 14, 1929

Inventor:
Ettore Bugatti
By Mauro + Lewis
Attorneys

Patented July 26, 1932

1,868,937

UNITED STATES PATENT OFFICE

ETTORE BUGATTI, OF MOLSHEIM, FRANCE

CRANK-SHAFT BEARING

Application filed November 14, 1929, Serial No. 407,165, and in France November 16, 1928.

In the construction of motors the cylinder block is, as is known, placed on a casing which carries the crank shaft bearings, or else the cylinder is cast in a single piece with the casing and the bearings.

The present invention has for object a special cylinder block whose particularity resides in the fact that the independent bearings, machined and bored separately are completed and secured to the block itself, the surfaces of contact being to this end perfectly finished.

The invention likewise concerns a mode of clamping assuring the alignment of the said bearings by means of a tongue and screw device.

The description which follows with respect to the accompanying drawing, given by way of example, will allow the manner in which my invention is carried out to be well understood.

In the drawing—

Figure 2:
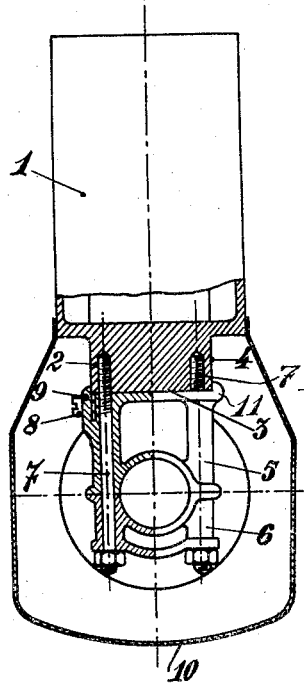
Fig. 2 is an end view of the cylinder block, partly in section along the line 1—1 of Fig. 1.
Figure 1:
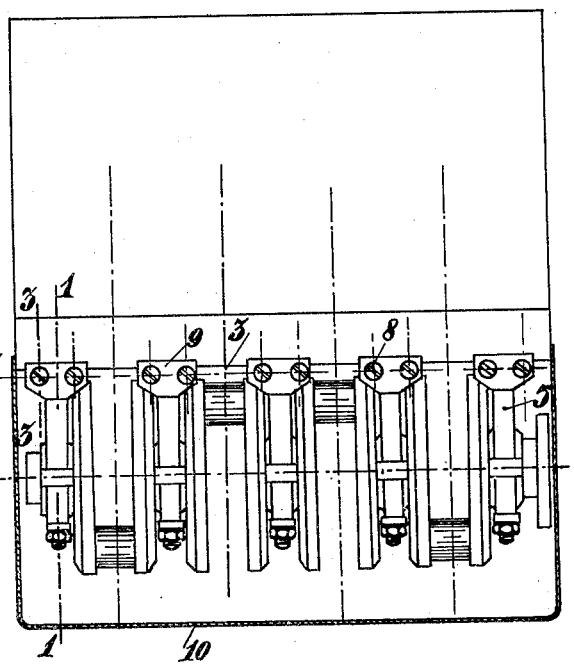
Fig. 1 is a side view of the cylinder block.
Figure 3:
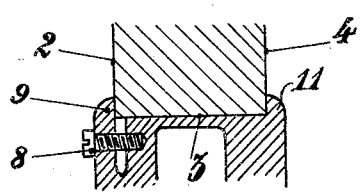
Fig. 3 is a section along the line 3—3 of Fig. 1.

As shown in the drawing, the lower portion of cylinder block 1 is provided with surfaces 2, 3, 4 machined with very great precision. Each bearing 5 is provided with a flat upper face adapted to be applied against surface 3 of the cylinder block, and with a solid flange 11 having a flat inner face adapted to be applied against surface 4 of the cylinder block. These flat surfaces of the bearing are very accurately machined in order to conform to the corresponding surfaces of the cylinder block. The bearing is further provided at its upper part with a U-shaped groove, one face of which extends upwardly so as to form a tongue 9 adapted to be applied against surface 2 of the cylinder block. A screw 8 extends throughout said tongue 9 and into the body of bearing 5.

It will readily be understood that, when mounting each bearing on the cylinder block, the bearing 5, together with its cap 6, is secured to the cylinder block by means of coupling pins 7. The bearing is thus accurately positioned in the vertical direction, due to the upper flat machined face of the bearing being applied against the surface 3 of the cylinder block. It is then possible, through the action of screw 8, to tightly apply the inner flat machined face of flange 11, against surface 4 of the cylinder block, which ensures the accurate positioning of the bearing in the lateral direction. As all of the bearings have been each mounted on a support strictly similar to the lower portion of cylinder block 1 for being separately bored in order to provide the cylindrical bores for the crank-shaft journals, it will readily be understood that, when all of the bearings are fitted on the cylinder block in the manner above described, said bores are in perfect alignment. All the stresses instigated by the load on the bearings are transmitted directly to the cylinder block. The usual casing of aluminium or cast iron, can be replaced by a light housing 10 of sheet aluminium, for example, which serves to protect the crank shaft and gather the oil projected by the bearings and cranks.

It is to be understood that modifications in detail might be attributed to my cylinder block without departing from the spirit of my invention as comprehended within the scope of the appended claims.

Having described my invention what I claim as new and desire to secure by Letters Patent is—

1. A crank-shaft bearing for internal combustion engines comprising a cylinder block having a flat machined under surface and adjoining flat machined lateral surfaces extending along the whole length thereof, a plurality of separate bearings having each a U-shaped groove at its upper end adapted to fit said flat surfaces, coupling pins for securing said bearings to said cylinder block, a tongue on one side of the grooved end of the bearings and a cooperating screw for applying the corresponding surfaces in perfect contact with each other respectively, whereby all the bearings can be machined and completed separately and subsequently mounted on the cylinder block in perfect alinement.

2. A crank-shaft bearing for internal combustion engines comprising a cylinder block having a flat machined under surface and adjoining flat machined lateral surfaces at right angles thereto extending along the whole length of the cylinder block, a plurality of separate bearings having each a U-shaped groove at its upper end adapted to fit said flat surfaces, coupling pins for securing said bearings to said cylinder block, a tongue on one side of the grooved end of each bearing and a cooperating screw for applying the corresponding surfaces in perfect contact with each other respectively, whereby all the bearings can be machined and completed separately and subsequently mounted on the cylinder block in perfect alinement.

3. A crank-shaft bearing for internal combustion engines comprising a cylinder block having a flat machined under surface and adjoining flat machined lateral surfaces at right angles thereto extending along the whole length of said cylinder block, a plurality of separate bearings having each a U-shaped groove at its upper end adapted to fit said flat surfaces, coupling pins for securing said bearings to said cylinder block, a tongue on one side of the grooved end of each bearing, a cooperating screw for applying the corresponding surfaces in perfect contact with each other respectively, whereby all the bearings can be machined and completed separately and subsequently mounted on the cylinder block in perfect alinement, and a separate crank casing made of light metal secured to said cylinder block.

4. A crank-shaft bearing for internal combustion engines comprising in combination a cylinder block having a plurality of flat machined surfaces thereon, a plurality of separate bearings having each a U-shaped groove at its upper end and each provided with a plurality of flat surfaces adapted to fit the flat surfaces of the cylinder block, means for securing said bearings to said cylinder block, means for applying the corresponding surfaces of the cylinder block and the bearings in perfect contact with each other respectively, whereby all the bearings can be machined and completed separately and subsequently mounted on the cylinder block in perfect alignment.

5. A crank-shaft bearing for internal combustion engines comprising in combination a cylinder block having a flat machined under surface and adjoining flat machined lateral surfaces extending along the whole length thereof, a plurality of separate bearings having each a U-shaped groove at its upper end and each provided with a plurality of flat surfaces adapted to fit the flat surfaces of the cylinder block, means for securing said bearings to said cylinder block, means for applying the corresponding lateral surfaces of the cylinder block and of the bearings in perfect contact with each other respectively, whereby all the bearings can be machined and completed separately and subsequently mounted on the cylinder block in complete alignment.

6. A crank-shaft bearing for internal combustion engines comprising in combination, a cylinder block having a flat machined under surface and adjoining flat machined lateral surfaces at right angles thereto extending along the whole length thereof, a plurality of separate bearings having each a U-shaped groove at its upper end and each provided with a plurality of flat surfaces adapted to fit the flat surfaces of the cylinder block, a plurality of coupling pins for securing said bearings to said cylinder block, means for applying the corresponding lateral surfaces of the cylinder block and of the bearings in perfect contact with each other respectively, whereby all the bearings can be machined and completed separately and subsequently mounted on the cylinder block in complete alignment.

7. A crank-shaft bearing for internal combustion engines comprising in combination, a cylinder block having a flat machined under face and adjoining flat machined lateral surfaces extending along the whole length thereof, a plurality of separate bearings having each a vertical U-shaped groove at its upper end close to one edge thereof, and each provided with a plurality of flat surfaces adapted to fit the flat surfaces of the cylinder block, means for securing said bearings to said cylinder block, means, adapted to cooperate with both sides of said U-shaped grooves for applying the corresponding lateral surfaces of the cylinder block and of the bearings in perfect contact with each other respectively, whereby all the bearings can be machined and completed separately and subsequently mounted on the cylinder block in perfect alignment.

In testimony whereof I have signed this specification.

ETTORE BUGATTI.